United States Patent [19]
Bendall

[11] 3,759,063
[45] Sept. 18, 1973

[54] LAMINATED DIAPHRAGM COUPLINGS

[76] Inventor: Wilfrid H. Bendall, 19 N. Broad St., Pawcatuck, Conn.

[22] Filed: Oct. 28, 1971

[21] Appl. No.: 193,352

[52] U.S. Cl. .................................. 64/11 R, 64/13
[51] Int. Cl. ............................................. F16d 3/78
[58] Field of Search ............................ 64/9, 11, 13

[56] References Cited
UNITED STATES PATENTS

| | | | |
|---|---|---|---|
| 1,445,272 | 2/1923 | Gill ........................................ | 64/13 |
| 1,775,556 | 9/1930 | Hewel .................................... | 64/13 |
| 1,664,052 | 3/1928 | Ungar .................................... | 64/13 |
| 2,510,414 | 6/1950 | Philbrick ................................ | 64/9 |
| 3,024,628 | 3/1962 | Yang ...................................... | 64/13 |

FOREIGN PATENTS OR APPLICATIONS 884,715    3/1953    Germany ................................. 64/13

*Primary Examiner*—Kenneth W. Sprague

[57] ABSTRACT

A laminated diaphragm coupling for drive shafts having a plurality of identically corrugated annular laminas flexibly conformable to a common center of corrugation curvature. The laminas assemble in coaxial interlaminary supporting contact to provide a torsionally stiff and axially flexible laminated diaphragm. The diaphragms have inner and outer circumferential edge portions adapted for interconnection with each other and with coupling members.

10 Claims, 8 Drawing Figures

Patented Sept. 18, 1973  3,759,063

LAMINATED DIAPHRAGM COUPLINGS

SUMMARY OF THE INVENTION

The present invention relates generally to flexible couplings and specifically to couplings using annular discs as their principal element. Couplings with flat, tapered and contoured discs are well known in the art and embody the desirable attributes of rotational rigidity together with a limited degree of axial flexibility. A substantially greater degree of axial flexibility would make such couplings more universally applicable for the wide range of drive requirements including constant velocity automotive propeller shafts, aerospace controls requiring synchronized inter-shaft coupling through relatively large angles without lost motion or backlash, and for the increasing industrial need for couplings with these attributes in a single design.

Meeting the foregoing requirements is a primary object of the present invention. Further important objects are to provide such a coupling of simple design and low cost construction, free from maintenance and lubrication and with structural elements in a conveniently separable and accessible form. Still further objects are to provide a basic coupling construction in which the torsional and axial characteristics, within given dimensions, can be readily varied to suit drive requirements by varying the proportions of its essential element - the laminated diaphragm. Further equally important objects are to provide such a coupling construction of all metal or equivalent heat resistant material capable of efficient operation over a wide temperature range, and a coupling noiseless in operation and inherently adapted to withstand high axial thrust loads and shaft longitudinal vibration.

Other objects and advantages of the present invention will be apparent to those knowledgeable in the art following reference to the accompanying description, drawings and claims of this specification.

DETAILED DESCRIPTION OF THE DRAWINGS

Figure 1:
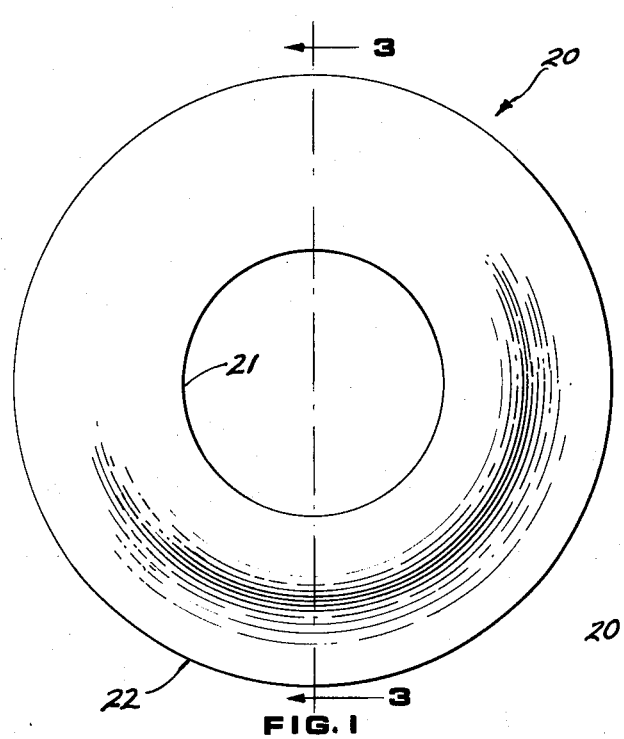
FIG. 1 is a diagrammatic face view of a corrugated annular lamina constituting the laminated diaphragm of this invention.
Figures 2, 3:
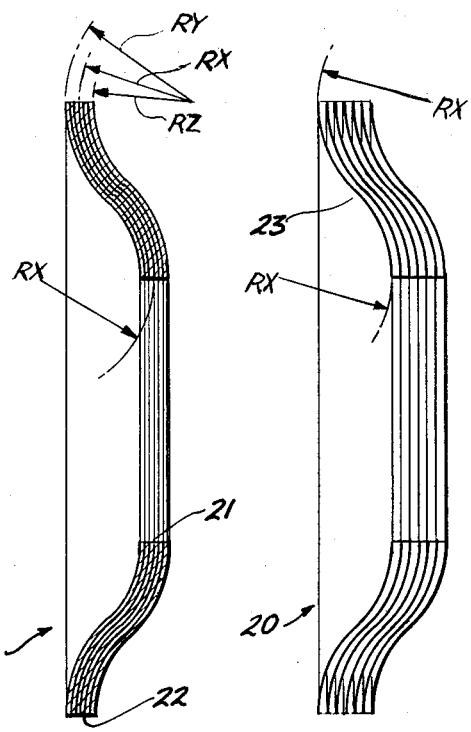
FIG. 2 is a diagrammatic cross-sectional view of a plurality of axially aligned loosely juxtaposed laminas of the form shown in FIG. 1.
FIG. 3 is a diagrammatic cross-sectional view of a plurality of laminas assembled in close conformity as they would appear on line 3—3 of FIG. 1.

Referring to the drawings, typical substantially conical and corrugated annular laminas constituting a preferred embodiment of the diaphragm of the present invention are shown diagrammatically and generally designated by reference numeral 20 in FIGS. 1-3, each lamina having an inner circumferential edge portion 21 and outer circumferential edge portion 22 in axially offset planes. Individual laminas thus formed, for example, with tangent corrugation radii indicated by arrow RX, will nest or assemble coaxially in partial contact at the approximate points of interlaminary tangency 23, as shown in FIG. 2. Radius RX thus defines a mean corrugation radius of curvature to which a plurality of laminas will assemble in close interlaminary supporting contact as indicated in FIG. 3, the number of laminas thus combined in a diaphragm being controlled by the individual lamina thickness and the allowable initial stress in assembling them to the desired maximum RY and minimum RZ radii. Since the objectives of torsional stiffness and axial flexibility postulate laminas constructed of relatively thin, flexible material, and therefore elastically formable to the corrugation configuration shown in the drawings, laminated flexible diaphragms of substantial total thickness and power transmitting capacity are attained by this method of construction.

Figure 4:
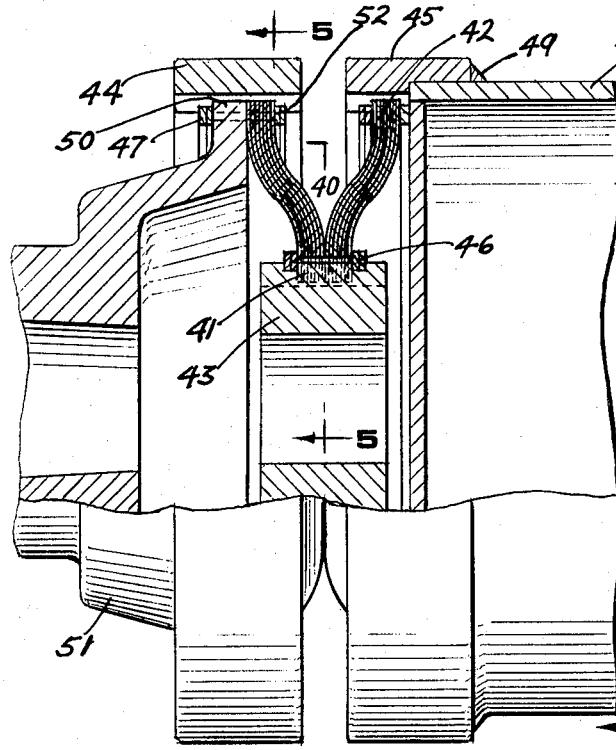
FIG. 4 is a partly sectioned longitudinal axial view of a coupling embodying the present invention.
Figure 5:
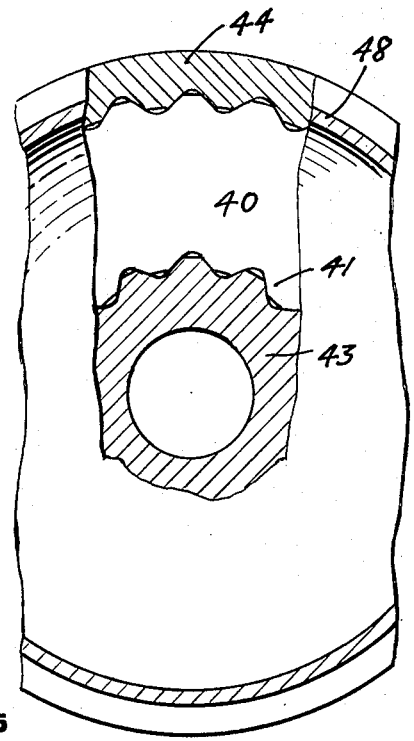
FIG. 5 is a fragmentary axial cross-section taken on line 5—5 of FIG. 4.

FIGS. 4 and 5 show an embodiment of this invention in a coupling construction adapted for use as a constant velocity universal joint for automotive propeller shafts. An opposed pair of laminated diaphragms 40 are provided with serrated inner and outer circumferential edge portions 41 and 42, respectively, engaging a serrated inner ring coupling member 43 and serrated outer ring members 44 and 45. The respective serration engagements are secured in assembly by retaining rings 46 and 47. An extension of serrated outer ring member 45 is secured to a tubular propeller shaft 48 by weld 49 on one side of the diaphragm assembly while an extension of outer ring member 44 engages the serrated flange 50 of coupling drive input hub member 51, in retention by ring 52.

It will be noted that the foregoing coupling construction embodies the stated objectives of this invention of mechanical simplicity, accessibility and ease of assembly. Further, since no sliding movement is required at the diaphragm interconnections the serrations of the latter may be of 45 degree pressure angle involute form, in close or press fitted assembly. Prior to assembly the individual laminas may be coated with a dry graphitic or molybdenite material as a deterrent to possible fretting of the adjacent surfaces.

Figure 6:
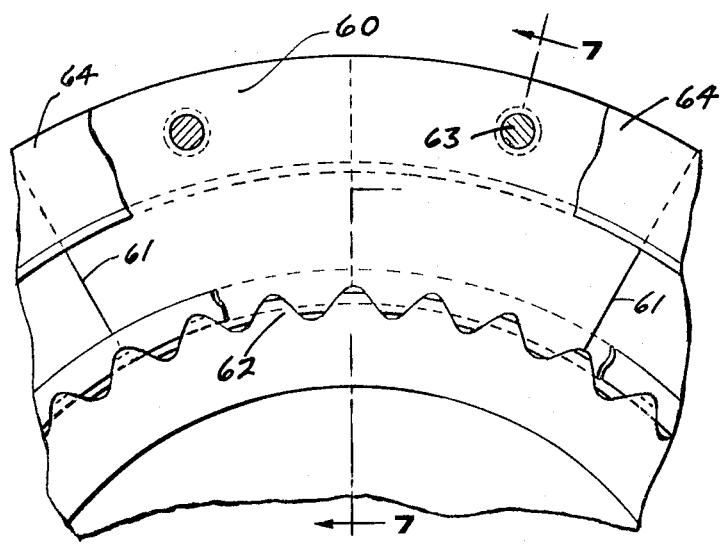
FIG. 6 is a fragmentary view on a larger scale of a modified coupling construction.
Figure 7:
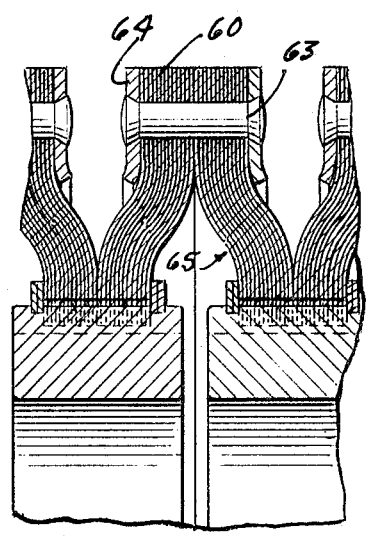
FIG. 7 is a fragmentary sectional view on line 7—7 of FIG. 6.

FIGS. 6 and 7 show a modification of this invention applicable to and adapting it for relatively large diameter couplings. Suitable high strength accurate gauge material may not be economically obtainable in widths required for one-piece laminas of large diameter. The modification in FIGS. 6 and 7 accordingly shows a diaphram construction utilizing segmental lamina portions 60 assembled with circumferentially spaced abutting edges 61, the individual layers being arranged in overlapped edge sequence. As in the earlier described coupling construction, involute serrations 62 are utilized at the inner circumferential edge portions of the diaphragm and may also be used at the outer edge or, alternatively, may comprise rivets 63 in an assembly with coupled diaphragm edge supporting rings 64. FIG. 7 further illustrates the use of a series of axially thick-sectioned laminated diaphragms 65 thus assembled and may also be viewed as showing a portion of a high capacity flexible shaft construction.

Figure 8:
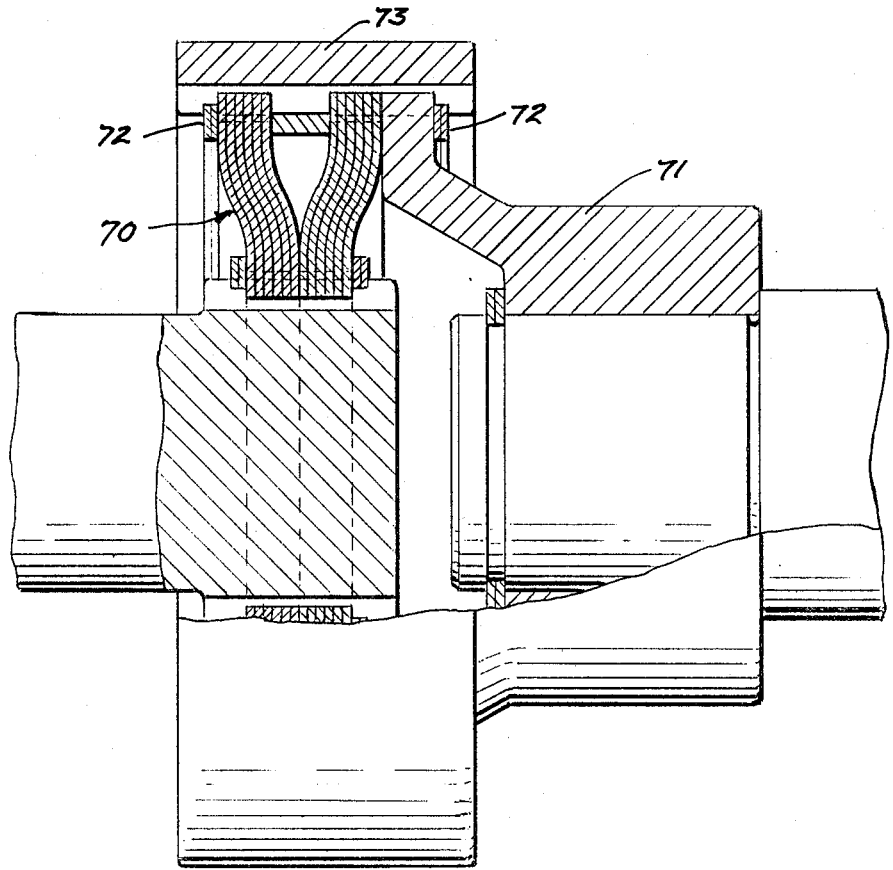
FIG. 8 is a partly sectioned longitudinal axial view of another modification.

FIG. 8 shows a further modification embodying laminated diaphragms in a coupling particularly adapted to withstand high axial thrust and tensional loads, as required, for example, in marine drives. In this modification edge portions of proportionately heavier, serrated, shaft-mounted diaphragms 70 abut coupling hub member 71 and retention means 72 in the serrated outer ring 73 to provide, in effect, a double-direction disc spring restraint against shaft axial thrust forces and also provide a useful degree of damping action against the troublesome longitudinal shaft vibrations characteristic of marine screw propeller action.

It is to be understood that the foregoing description and accompanying drawings describe and illustrate preferred embodiments of the present invention and further, that this invention lends itself to a number of modifications, adaptations and changes which will be apparent to those skilled in the art and which fall within the scope of the appended claims.

I claim:

1. Laminated diaphragm coupling means comprising coaxial externally and internally serrated annular driving members interconnected by a plurality of coaxial externally and internally serrated annular laminas of thin, high strength, spring-tempered material, each of said laminas having an identically formed annular corrugation, said laminas being adapted for free coaxial assembly in partial interlaminary contact with each other and subsequent axial compression into full interlaminary contact with each other between annular compression retention means, the thinness and spring-tempered condition of said laminas enabling elastic reforming of said identically formed corrugations to contiguous corrugations having a common center of corrugation curvature, said assembly thereby constituting a simply constructed laminated diaphragm of substantial axial thickness and high power transmitting capacity.

2. The coupling means as defined in claim 1 wherein said driving members are annularly grooved and said diaphragm assembles with inner and outer edge portions in axially compressed restraint between annular retaining members in said grooves.

3. The coupling means as defined in claim 2 wherein said outer edge portions are in axially spaced compressed restraint between outer edge annular retention means and said inner edge portions are in axially compressed abutting restraint between inner edge annular retention means.

4. The coupling means as defined in claim 1 wherein said laminas have a substantially conical form with inner and outer edge portions in axially spaced planes.

5. The coupling means as defined in claim 4 further comprising diaphragms having laminas of said conical form.

6. The coupling means as defined in claim 1 wherein said diaphragm further comprises a plurality of segmental lamina portions in coplanar circumferentially abutting relationship.

7. The coupling means as defined in claim 1 further comprising a plurality of said diaphragms having abutting inner edge portions interconnected by an externally serrated driving member, one of said diaphragms further having an externally serrated outer edge portion abutting an externally serrated outer edge portion of a driving member and having an internally serrated annular driving member bridging and interconnecting said abutting portions, and one of said diaphragms having an externally serrated outer edge portion engaging internal serrations of an annular driving member secured to a tubular member comprising a drive shaft extension thereof.

8. The coupling means as defined in claim 1 further comprising a plurality of diaphragms having abutting inner edge portions engaging an externally serrated drive shaft and having axially spaced outer edge portions bridged and interconnected by an internally serrated annular driving member to an externally serrated driving hub.

9. The coupling means as defined in claim 1 wherein said driving members further comprise annular diaphragm abutment and edge retention means arranged to absorb high axial compression, tensional and torsional loads transmitted through said diaphragms.

10. The coupling means as defined in claim 1 wherein the interconnection of said driving members and diaphragms includes manually removable diaphragm edge retention means.

* * * * *